United States Patent
Fair

(10) Patent No.: US 11,003,543 B2
(45) Date of Patent: May 11, 2021

(54) GENERIC METADATA TAGS WITH NAMESPACE-SPECIFIC SEMANTICS IN A STORAGE APPLIANCE

(71) Applicant: EMC IP Holding Company LLC, Hopkinton, MA (US)

(72) Inventor: Robert L. Fair, Cary, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 349 days.

(21) Appl. No.: 15/965,657

(22) Filed: Apr. 27, 2018

(65) Prior Publication Data

US 2019/0332487 A1 Oct. 31, 2019

(51) Int. Cl.
  *G06F 16/22* (2019.01)
  *G06F 11/14* (2006.01)
  *G06F 16/215* (2019.01)

(52) U.S. Cl.
  CPC ...... *G06F 11/1451* (2013.01); *G06F 16/2291* (2019.01); *G06F 16/215* (2019.01); *G06F 16/2246* (2019.01)

(58) Field of Classification Search
  CPC .................................................. G06F 16/2246
  See application file for complete search history.

(56) References Cited

U.S. PATENT DOCUMENTS

| | | | | |
|---|---|---|---|---|
| 2008/0249995 | A1* | 10/2008 | Balassanian | G06F 16/178 |
| 2012/0158689 | A1* | 6/2012 | Doshi | G06F 16/1873 707/706 |
| 2018/0322136 | A1* | 11/2018 | Carpentier | G06F 9/45558 |

\* cited by examiner

*Primary Examiner* — Kris E Mackes
(74) *Attorney, Agent, or Firm* — Womble Bond Dickinson (US) LLP

(57) ABSTRACT

Disclosed is a method, apparatus, and system for a method for enforcing namespace-specific semantics based on object operations, the method comprising: detecting an operation performed on an object of a data storage system in a namespace associated with the object; determining whether additional operations on a tagset associated with the object are mandated by one or more semantics that are specific to the namespace based on the operation, a persona of the object in the namespace, and the one or more semantics; and in response to determining that additional operations are mandated by the one or more semantics, performing the additional operations mandated by the one or more semantics on the tagset.

18 Claims, 4 Drawing Sheets

GENERIC METADATA TAGS WITH NAMESPACE-SPECIFIC SEMANTICS IN A STORAGE APPLIANCE

FIELD OF THE INVENTION

Embodiments of the disclosure relate to data storage systems, and more particularly, to metadata in data storage systems.

BACKGROUND

A data storage system may enable client devices to regularly back up data to a networked storage through a communications network environment, and in the event of data loss or corruption, to restore the data.

Metadata is data describing other data. Examples of metadata may include the file owner, size, creation time, and so on.

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
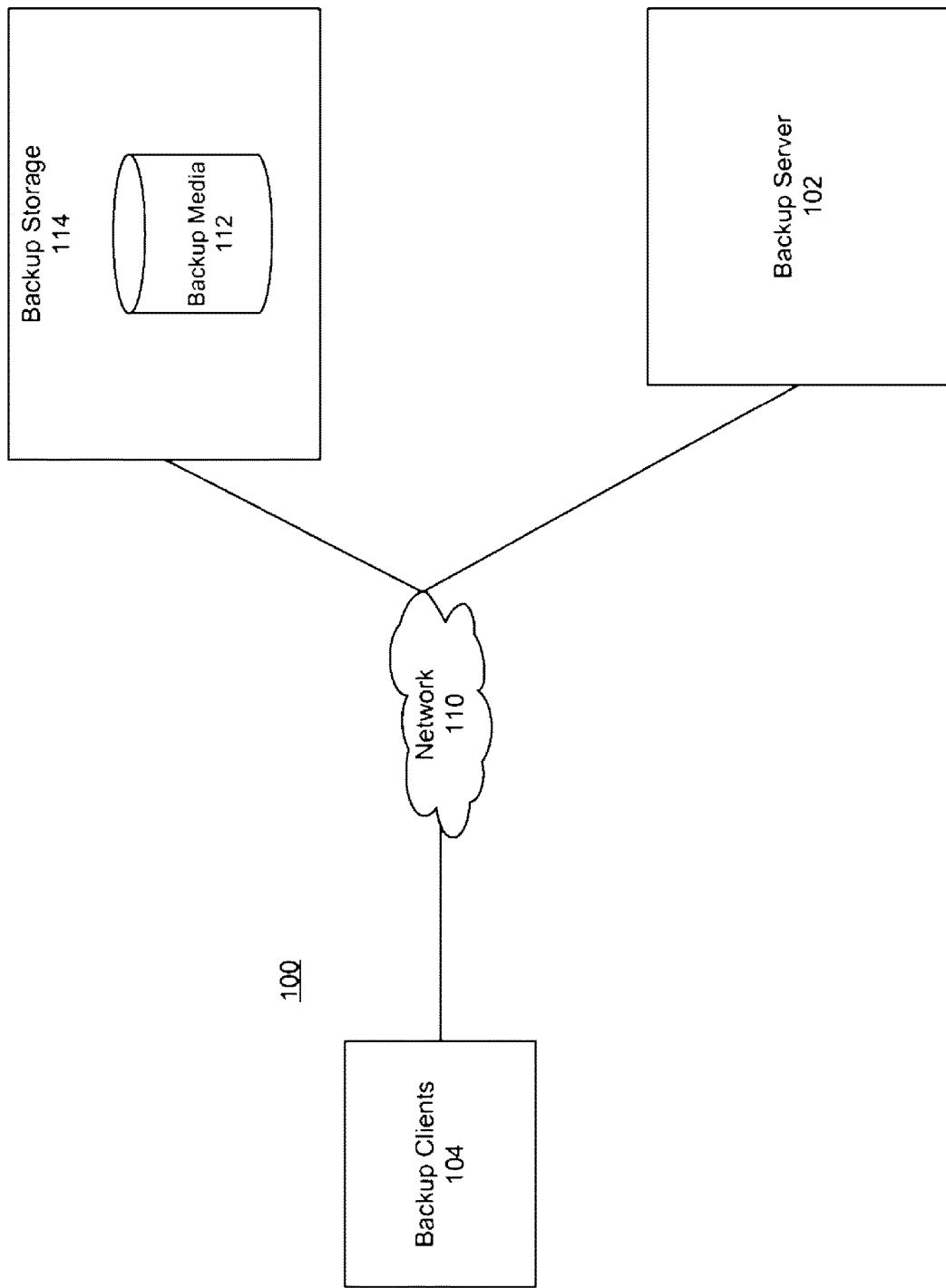
FIG. 1 is a block diagram illustrating a computer network system where embodiments of the disclosure may be performed.

FIG. 1 illustrates a computer network system 100 where embodiments of the disclosure may be performed. In system 100, a number of clients 104 are backup clients or nodes that have data that needs to be backed up. A network or backup server computer 102 is coupled directly or indirectly to these clients through network 110, which may be a cloud network, Local Area Network (LAN), Wide Area Network (WAN) or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform.

The data generated within system 100 may be stored in a backup media 112 of a backup storage node 114. The backup media may be located at any number of persistent storage locations and devices, such as local client storage, server storage, or network storage, which may at least be partially implemented through storage device arrays, such as Redundant Array of Independent Disks (RAID) components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets.

For the embodiment of FIG. 1, network system 100 includes backup server 102, one or more backup clients 104, and backup storage node 114. A backup client executes processes for backing up data to the storage node, restoring the backed up data, and coordinating with backup server processes on the backup server and processes on the storage node. The backup server processes include processes to index the backups and identify which savesets reside on which backup devices or volumes. The backup storage node executes processes for receiving backup information from the backup client, writing data to the backup devices or volumes, sending tracking information to the backup server to track the data written to the devices or volumes, and reading the data from the devices or volumes at the request of the client during a recovery. In an embodiment, system 100 may represent a Data Domain Replicator (DDR)-based deduplication storage system, and a storage server or node having the backup media may be implemented as a DDR Deduplication Storage server provided by Dell EMC.

File/object metadata tags (may be referred to simply as "tags" hereinafter) are a class of metadata stored in a data storage system and managed using a metadata tag and search subsystem. The metadata tag and search subsystem may be distinct from the filesystem of the data storage system. Thus, tags may also exist for non-filesystem objects (e.g., system management). Tags may describe the properties and state of the associated object. Further, tags may be stored in an indexed and queryable data store called a tagstore. Thus, the tags may be automatically indexed and searchable.

The tags may be created, updated, and queried by either external user applications or internal applications of the data storage system (e.g., the combination of backup server 102 and backup storage 114 in system 100). Each object (e.g., file) may be associated with multiple tags, and each tag may have a name and a value (i.e., a tag is a name/value pair). The value of a tag may be a string, a BLOB (binary large object), or an integer. In other words, the tags may be typed.

Each object may be associated with and identified by a unique identifier, such as a 128-bit UUID (Universal Unique Identifier). Furthermore, each object may be associated with and identified by one or more personas. A persona is a string-based key unique in a particular namespace. In other words, each object may be associated with one or more namespaces, and may be identified in each associated namespace by a respective unique persona. Accordingly, a persona may also be referred to as a namespace key.

Each namespace may be associated with and identified by an integer. Examples of namespaces may include filesystem files and directories, System Management (SM) objects, vdisk (virtual disk) static images, etc. Each namespace may be further associated with and identified by a string representation (e.g., "vdisk," or "file," etc.) Namespaces can have additional functionality. For example, an object with a file persona (i.e., the object is associated with the file-namespace) can be replicated based on the file path of the object.

Therefore, for example, a vdisk static image object may have two personas, one in a vdisk-namespace, and the other in a file-namespace. The persona of the object in the vdisk-namespace may be a vdisk-GUID (globally unique identifier), and the persona of the same object in the file-namespace may be a file path. Any associated persona can be used to query and/or update an object.

Tags associated with a same object may be operated on as a whole, and may be referred to collectively as a tagset. The namespaces with which an object is associated and the personas of the object may be stored in the tagset associated with the object.

Figure 2:
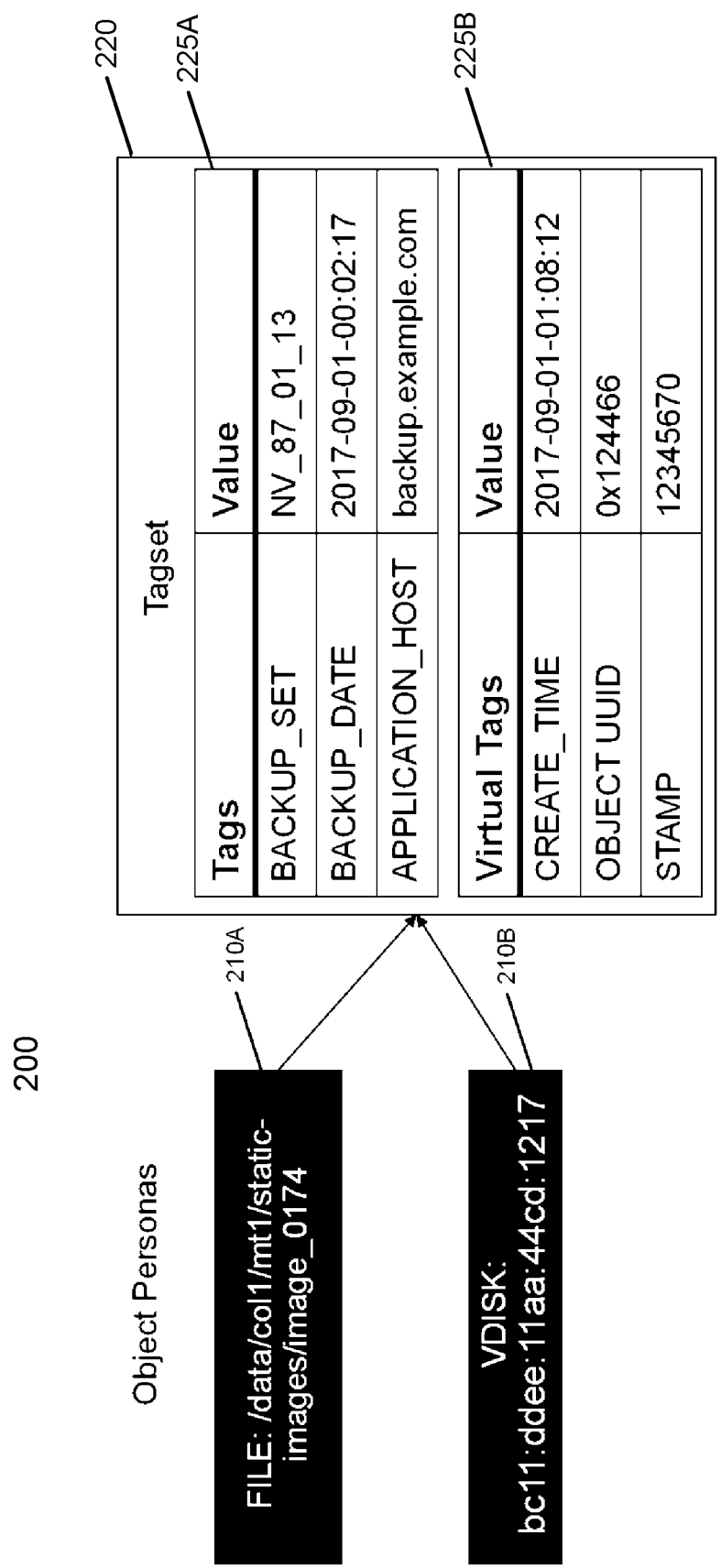
FIG. 2 is a diagram illustrating personas and a tagset associated with an example object in a data storage system.

Referring to FIG. 2, a diagram 200 illustrating personas and a tagset associated with an example object in a data storage system is shown. The example object is associated with two namespaces: the file-namespace and the vdisk-namespace. The persona 210A of the object in the file-namespace is the file path of the object: /data/col1/mt1/static-images/image_0174, while the persona 210B of the object in the vdisk-name space is the vdisk-GUID of the object: bc11:ddee:11aa:44cd:1217. The tagset 220 associated with the example object comprises 6 tags, each of which is a name/value pair. The tags in the tagset may be divided into two subgroups: standard (or user/application-defined) tags 225A, which are referred to simply as tags in FIG. 2, and system tags 225B, which are automatically generated by the data storage system and referred to as virtual tags in FIG. 2. The system tags may comprise such tags that indicate the creation time of the object, the object UUID, the sequence stamp of the object, etc. Both standard and system tags are accessible to and searchable by users and/or applications. In some embodiments, system tags may be read-only to users and/or applications.

Embodiments of the disclosure are directed to enforcing namespace-specific semantics on object operations. A semantic may be an action that should be taken when a particular operation on an object is performed. For example, if an object is an MTree file (An MTree is a data management object that enables data management operations like snapshot and replication and represents a filesystem), and is being snapshotted or replicated, the associated tagset should be snapshotted or replicated along with the MTree file. This may be implemented with a file-namespace-specific semantic.

Figure 3:
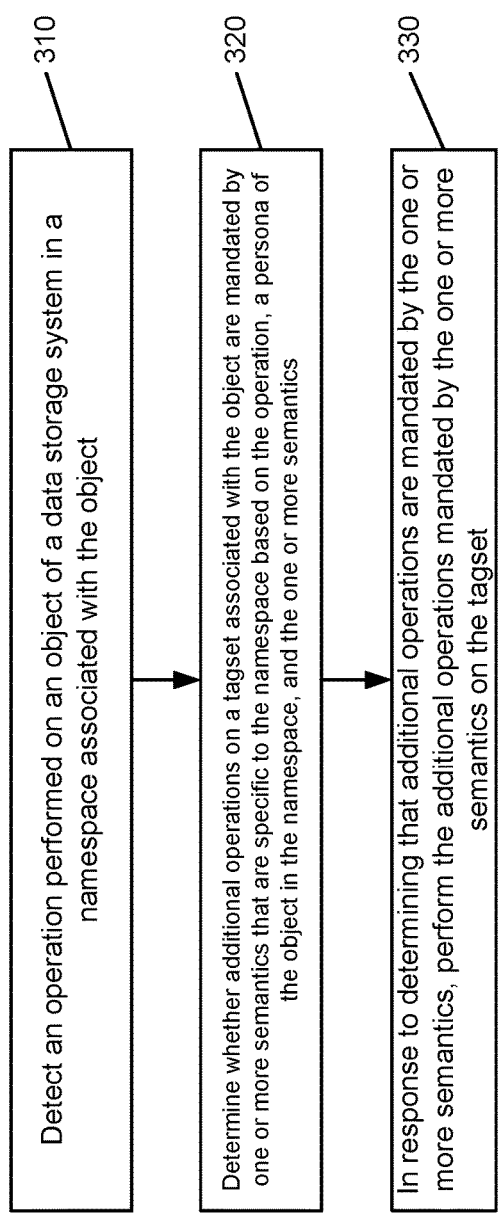
FIG. 3 is a flowchart illustrating an example method for enforcing namespace-specific semantics based on object operations.

Referring to FIG. 3, a flowchart illustrating an example method 300 for enforcing namespace-specific semantics based on object operations is shown. In one embodiment, the method may be implemented at the backup server 102 of FIG. 1. At block 310, an operation performed on an object in a namespace associated with the object may be detected. At block 320, whether additional operations on a tagset associated with the object are mandated by one or more semantics that are specific to the namespace may be determined based on the operation, a persona of the object in the namespace, and the one or more semantics. At block 330, in response to determining that additional operations are mandated by the one or more semantics, the additional operations mandated by the one or more semantics may be performed on the tagset.

In one embodiment, a semantic specific to a file-namespace may mandate that when an MTree file object is snapshotted, a tagset associated with the MTree file object be snapshotted along with the MTree file object. Another semantic specific to the file-namespace may mandate that when an MTree file object is replicated, a tagset associated with the MTree file object be replicated along with the MTree file object.

In method 300, the tagset may comprise standard metadata tags and system metadata tags. The tagset may be associated with an object of a data storage system, which may be a filesystem file. The object of the data storage system may be identifiable with a UUID. Further, the object of the data storage system may be associated with one or more namespaces, and may be identifiable with a unique persona in each associated namespace.

Note that some or all of the components and operations as shown and described above (e.g., operations of method 300 illustrated in FIG. 3) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
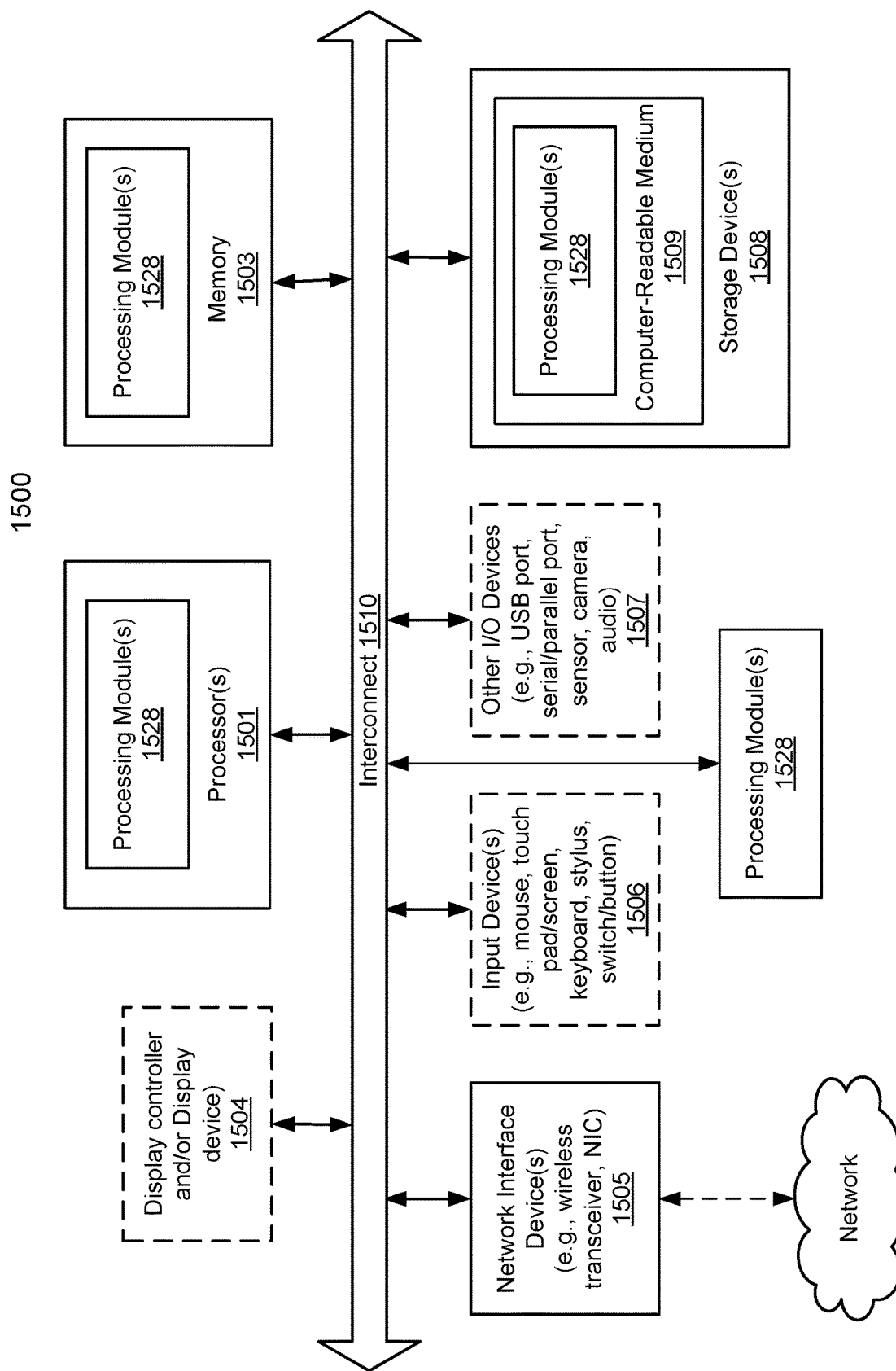
FIG. 4 is a block diagram illustrating a data processing system according to one embodiment.

FIG. 4 is a block diagram illustrating an example of a data processing system which may be used with one embodiment of the invention. For example, system 1500 may represent any of data processing systems such as backup clients 104 and backup server 102 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., basic input output system or BIOS), and/or applications can be loaded in memory 1503 and executed by processor 1501. An operating system can be any kind of operating systems, such as, for example, Windows operating system from Microsoft®, Mac OS X®/iOS® from Apple, Android from Google®, Linux®, Unix®, or other real-time or embedded operating systems such as VxWorks.

System 1500 may further include input/output (IO) devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage device (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the same software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination of hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for enforcing namespace-specific semantics
   based on object operations, the method comprising:
   detecting an operation performed on an object of a data storage system in a namespace associated with the object, wherein each object is associated with one or more namespaces;
   determining whether additional operations on a tagset associated with the object are mandated by one or more semantics that are specific to the namespace based on the operation, a persona of the object in the namespace, and the one or more semantics, wherein each object is identifiable in each associated namespace by a respective unique persona, wherein the tagset includes system metadata tags generated automatically by the data storage system, and wherein the system metadata tags include virtual tags indicating a creation time of the object, a universal unique identifier of the object, and a sequence stamp of the object; and
   in response to determining, based on a creation time of the object, a universal unique identifier of the object, and a sequence stamp of the object, that additional operations are mandated by the one or more semantics, performing the additional operations mandated by the one or more semantics on the tagset.

2. The method of claim 1, wherein a semantic specific to a file-namespace mandates that when an MTree file object is snapshotted, a tagset associated with the MTree file object be snapshotted along with the MTree file object.

3. The method of claim 1, wherein a semantic specific to a file-namespace mandates that when an MTree file object is replicated, a tagset associated with the MTree file object be replicated along with the MTree file object.

4. The method of claim 1, wherein the tagset comprises standard metadata tags and the system metadata tags.

5. The method of claim 1, wherein the object of the data storage system is a filesystem file.

6. The method of claim 1, wherein the object of the data storage system is identifiable with a Universal Unique Identifier (UUID).

7. A non-transitory machine-readable medium having instructions stored therein, which when executed by a processor, cause the processor to perform operations, the operations comprising:
- detecting an operation performed on an object of a data storage system in a namespace associated with the object, wherein each object is associated with one or more names paces;
- determining whether additional operations on a tagset associated with the object are mandated by one or more semantics that are specific to the namespace based on the operation, a persona of the object in the namespace, and the one or more semantics, wherein each object is identifiable in each associated namespace by a respective unique persona, wherein the tagset includes system metadata tags generated automatically by the data storage system, and wherein the system metadata tags include virtual tags indicating a creation time of the object, a universal unique identifier of the object, and a sequence stamp of the object; and
- in response to determining, based on a creation time of the object, a universal unique identifier of the object, and a sequence stamp of the object, that additional operations are mandated by the one or more semantics, performing the additional operations mandated by the one or more semantics on the tagset.

8. The non-transitory machine-readable medium of claim 7, wherein a semantic specific to a file-namespace mandates that when an MTree file object is snapshotted, a tagset associated with the MTree file object be snapshotted along with the MTree file object.

9. The non-transitory machine-readable medium of claim 7, wherein a semantic specific to a file-namespace mandates that when an MTree file object is replicated, a tagset associated with the MTree file object be replicated along with the MTree file object.

10. The non-transitory machine-readable medium of claim 7, wherein the tagset comprises standard metadata tags and the system metadata tags.

11. The non-transitory machine-readable medium of claim 7, wherein the object of the data storage system is a filesystem file.

12. The non-transitory machine-readable medium of claim 7, wherein the object of the data storage system is identifiable with a Universal Unique Identifier (UUID).

13. A data processing system, comprising:
a processor; and
a memory coupled to the processor to store instructions, which when executed by the processor, cause the processor to perform operations, the operations including:
- detecting an operation performed on an object of a data storage system in a namespace associated with the object, wherein each object is associated with one or more namespaces;
- determining whether additional operations on a tagset associated with the object are mandated by one or more semantics that are specific to the namespace based on the operation, a persona of the object in the namespace, and the one or more semantics, wherein each object is identifiable in each associated namespace by a respective unique persona, wherein the tagset includes system metadata tags generated automatically by the data storage system, and wherein the system metadata tags include virtual tags indicating a creation time of the object, a universal unique identifier of the object, and a sequence stamp of the object; and
- in response to determining, based on a creation time of the object, a universal unique identifier of the object, and a sequence stamp of the object, that additional operations are mandated by the one or more semantics, performing the additional operations mandated by the one or more semantics on the tagset.

14. The data processing system of claim 13, wherein a semantic specific to a file-namespace mandates that when an MTree file object is snapshotted, a tagset associated with the MTree file object be snapshotted along with the MTree file object.

15. The data processing system of claim 13, wherein a semantic specific to a file-namespace mandates that when an MTree file object is replicated, a tagset associated with the MTree file object be replicated along with the MTree file object.

16. The data processing system of claim 13, wherein the tagset comprises standard metadata tags and the system metadata tags.

17. The data processing system of claim 13, wherein the object of the data storage system is a filesystem file.

18. The data processing system of claim 13, wherein the object of the data storage system is identifiable with a Universal Unique Identifier (UUID).

* * * * *